(12) United States Patent
Barton et al.

(10) Patent No.: US 6,418,505 B1
(45) Date of Patent: Jul. 9, 2002

(54) ACCESSING BEYOND MEMORY ADDRESS RANGE OF COMMODITY OPERATING SYSTEM USING ENHANCED OPERATING SYSTEM ADJUNCT PROCESSOR INTERFACED TO APPEAR AS RAM DISK

(75) Inventors: Richard R. Barton, Lexington; Peter Washington, Little Mountain; John H. Waters, Columbia, all of SC (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/215,629

(22) Filed: Dec. 17, 1998

(51) Int. Cl.[7] .............................................. G06F 12/00
(52) U.S. Cl. ............................ 711/2; 709/327; 712/32; 713/1
(58) Field of Search ............................. 709/327; 711/2; 712/32; 713/1

(56) References Cited

U.S. PATENT DOCUMENTS

| | | | |
|---|---|---|---|
| 4,591,975 A | * 5/1986 | Wade et al. | ............... 710/260 |
| 4,648,035 A | 3/1987 | Fava et al. | ................... 711/202 |
| 5,341,484 A | 8/1994 | Tanaka et al. | .............. 709/100 |
| 5,363,497 A | * 11/1994 | Baker et al. | ................ 711/153 |
| 5,642,495 A | 6/1997 | Ammann et al. | ........... 711/153 |
| 5,812,843 A | * 9/1998 | Yamazaki et al. | .......... 709/100 |
| 5,887,164 A | * 3/1999 | Gupta | ............................ 713/2 |
| 5,938,765 A | * 8/1999 | Dove et al. | .................... 713/1 |

* cited by examiner

Primary Examiner—Kenneth S. Kim
(74) Attorney, Agent, or Firm—Steven J. Adamson

(57) ABSTRACT

A multi-processor computer system that includes at least one "regular" processor and one "enhanced mode" processor. The enhanced mode processor is preferably not turned over to the regular processor, but is initialized to look like an internal or external device, such as a disk drive or the like. In a preferred embodiment, fast access memory that is outside the addressable range of the regular processor is coupled to the enhanced mode processor and accessed through a RAM-disk device driver. In this manner, the amount of fast access memory available to the regular processor is increased.

7 Claims, 3 Drawing Sheets

ACCESSING BEYOND MEMORY ADDRESS RANGE OF COMMODITY OPERATING SYSTEM USING ENHANCED OPERATING SYSTEM ADJUNCT PROCESSOR INTERFACED TO APPEAR AS RAM DISK

FIELD OF THE INVENTION

The present invention relates to multi-processor computer systems and, more specifically, to multi-processor computer systems that incorporate special mode processors.

BACKGROUND OF THE INVENTION

A trend in the computer industry has been to develop computers that utilize faster processors, have greater through-put and support larger physical memories. The size of available fast access memory is dependent on the size of the processor's address bus. For example, both Intel and AMD produce commercially available processors that have a thirty-two bit address bus and, therefore, support $2^{32}$ or 4 Gbytes of physical memory. If more memory is required, however, a user must (1) resort to slow disk memory or (2) purchase a processor with a larger address bus, e.g., 64 bits. Processors with larger address buses are undesirably expensive and are unsupported by current commodity operating systems (as discussed below). Thus a need exists to increase fast access memory beyond 4 GB (i.e., conventional 32 bit address) in a cost effective manner.

Several well known operating systems have been developed for processors that utilize a 32 bit address bus and these include Windows NT of Microsoft Corporation and several UNIX implementations and the like. Since these operating systems are widely available they are referred to herein as "commodity" operating systems.

In an attempt to provide more fast access memory (amongst other features), processors with enhanced or special modes of operation have been developed. One example of a special mode is the physical address extension mode of the Pentium Pro family of processors. PAE mode allows a processors 32-bit virtual address space to map to a 36-bit physical address space. This is accomplished by requiring a drastically different format for page tables than is required with a normal 32-bit physical address space. While this mode has potential, it has not been exploited commercially because of the lack of a commodity operating system that supports it. Software vendors have decided to wait for 64 bit processors rather than write new operating systems, etc., for the apparent stop gap 36-bit physical address mode and the like.

SUMMARY OF THE INVENTION

Accordingly, it is an object of the present invention to provide an increased amount of addressable memory space in a computer system.

It is another object of the present invention to provide a computer system that has a multiplicity of processors that operate in different modes.

It is also object of the present invention to increase the amount of addressable memory space in a computer system in a cost effective manner and without increasing the size of the address bus.

These and related objects of the present invention are achieved by use of a computing apparatus and method having an adjunct processor as described herein.

The attainment of the foregoing and related advantages and features of the invention should be more readily apparent to those skilled in the art, after review of the following more detailed description of the invention taken together with the drawings.

DETAILED DESCRIPTION

Figure 1:
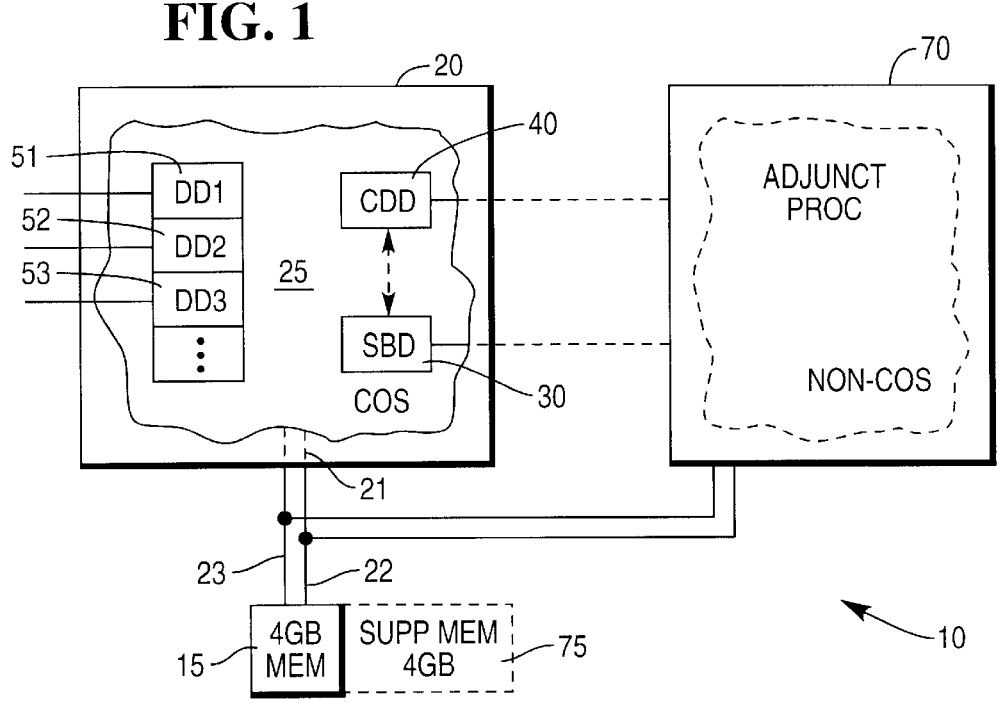
FIG. 1 is a block diagram of a multi-processor (MP) computing system in accordance with the present invention.

Referring to FIG. 1, a diagram of a computer system 10 having increased fast access memory in accordance with the present invention is shown. System 10 includes a processor 20 with, for example, a conventional 32 bit address bus 21. While processor 20 preferably has a 32 bit address bus, it should be recognized that the present invention (and particularly the use of adjunct processors) is not limited to 32 bit embodiments. Processor 20 preferably contains a special platform driver (SPD) 30 and adjunct RAM-disk device driver (RDD) 40 and a plurality of standard device drivers (DD1,DD2,DD3,etc.). SPD 30 and RDD 40 are discussed in more detail below. The standard device drivers may support a floppy drive, disk drive, monitor, etc., (not shown) as is known in the art. A fast access memory 15 is coupled to processor 20. Line 22 preferably propagates the 32 bits of address information, while lines 23 preferably propagates data and control signals. Processor 20 preferably operates a commodity operation system (COS) 25.

A second processor 70 is also provided in system 10. Processor 70 is of the type that provides access to fast access (FA) memory space that is larger than that addressable by the address bus of processor 20. A suitable processor is the Pentium Pro of Intel Corporation that is configured in physical address extension (PAE) mode or the like.

In PAE mode, processor 70 can address 36 bits of physical memory using a 32 bit virtual address due to special page table formats. In PAE mode, processor 70 preferably executes machine instructions provided by the SPD.

Supplemental fast access memory 75 is preferably controlled by processor 70. Supplemental memory 75 is in addition to the 4 GB of memory controlled by processor 20. In a preferred embodiment, supplemental memory 75 is 4 GB (for a total FA memory of 8 GB) though supplemental memory 75 could be larger (e.g., $2^{36}$ =68 GB and minus the 4 GB controlled by processor 20 gives a supplemental memory level of 64 GB).

Processor 70 in PAE mode or in another non-COS supported mode (i.e., an "enhanced mode") is termed an "adjunct" processor herein. This adjunct processor is preferably controlled by a custom device driver. In a preferred embodiment, the custom device driver is configured such that processor 70 and memory 80 appear to processor 20 simply as a RAM based disk drive (i.e., a RAM disk). Hence, the custom device driver is referred to herein as RAM-disk device driver (RDD) 40.

Operation

Figure 2:
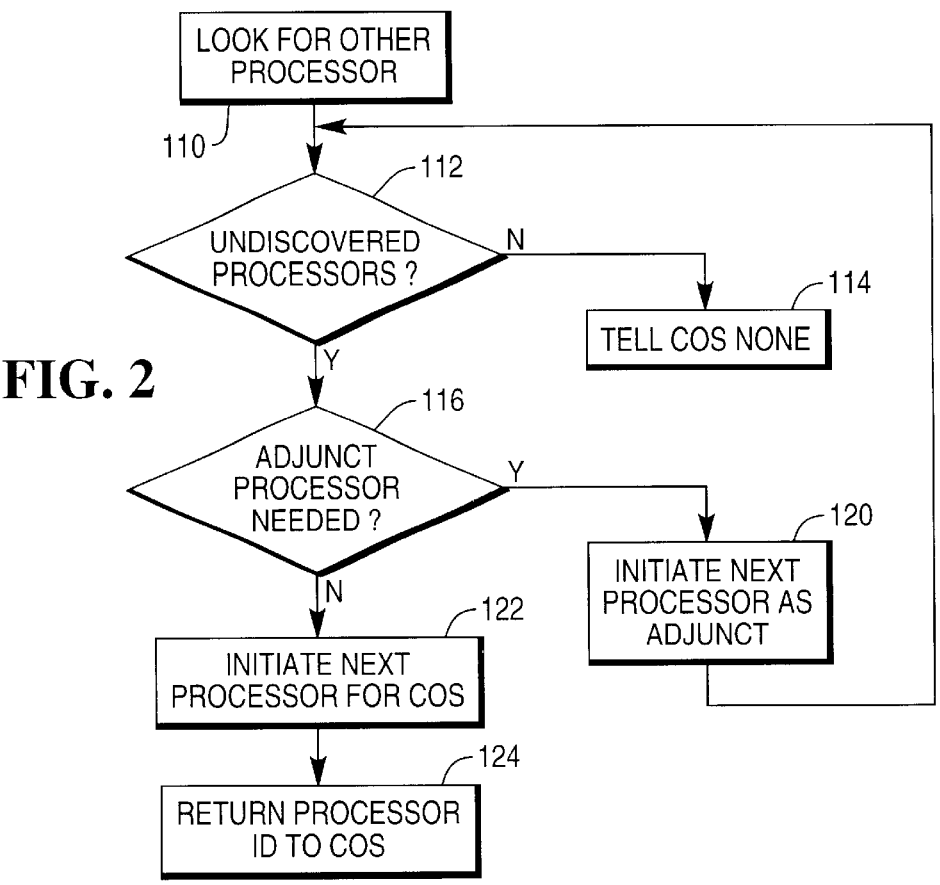
FIG. 2 is a diagram of a platform driver in accordance with the present invention.

Referring to FIG. 2, a high level flow diagram of special platform driver (SPD) 30 in accordance with the present invention is shown. SPD 30 is a boot driver resident in processor 20. During boot of computer system 10, the COS of processor 20 calls SPD 30 to look for any other processors (step 110). In step 112, SPD 30 determines if there are any undiscovered processors. If there are no undiscovered processors, then flow returns to the COS (with an indication that there are no undiscovered processors).

If an undiscovered processor is detected, then in step 116, a determination is made as to whether all of the requisite adjunct processors have been implemented. In the system of FIG. 1, there is only one other processor and hence that processor by default is initialized as the adjunct processor. In other systems, however, there may be 3 or 4 or more processors and 2 or more adjunct processors. Decisions such as how many processors to initialize as adjunct processors and even which processors to initialize as adjunct processors are preferably made by the SPD based on configuration information stored by the COS. This information maybe passed to the COS through a command line argument or burned in or passed in another known manner.

If it is determined, in step 116, that another adjunct processor is needed to fulfill the predefined number of adjunct processor(s), then control passed to adjunct processor initialization step 120. Step 120 preferably comprises many smaller steps such as (1) loading an appropriate instruction set for the adjunct processor, (2) placing the processor in a predefined mode, for example, PAE mode, and (3) establishing an interface (such as the RDD) for communicating with the COS.

If it is determined, in step 116, that all requisite adjunct processors have been initialized then the subject processor is initialized for use by the COS (step 122) and the identity of the processor is returned to the COS (step 124). Note that if a processor is an adjunct processor, then its identity is not returned to the COS.

Figure 3A:
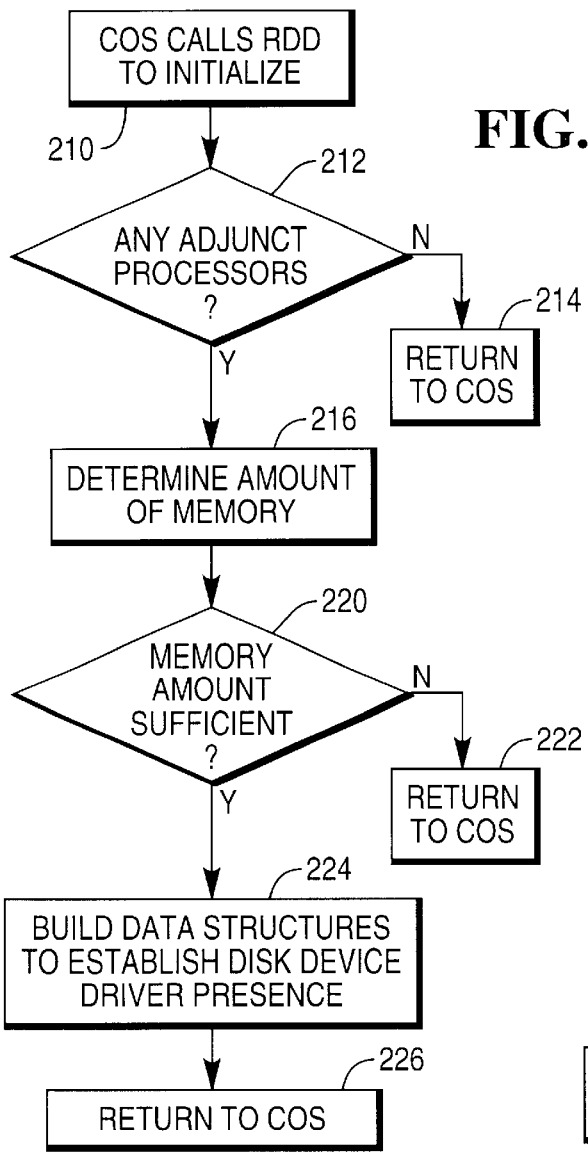
FIGS. 3A–3B are a diagram of a RAM disk driver in accordance with the present invention.

Referring to FIG. 3A, a flow diagram of processing (related to configuring an adjunct device driver) for an adjunct RAM-disk device driver (RDD) in accordance with the present invention is shown. In step 210, the RDD is called by the COS to initialize. The RDD determines if there are any adjunct processors (step 212) and if so, determines how much memory is associated with each adjunct processor (step 216). If there are no adjunct processors than control returns to the COS (step 214).

In step 220, a determination is made as to whether the memory associated with an adjunct processor is sufficient to justify the software and processing overhead of establishing a disk drive appearance for that adjunct processor. If the amount of memory is insufficient, then flow returns to the COS (step 222).

If, however, the amount of memory is sufficient, then data structures (tables, etc.) which would make the COS perceive the device as a disk driver are preferably created (step 224). Flow then returns to the COS (step 226).

Figure 3B:
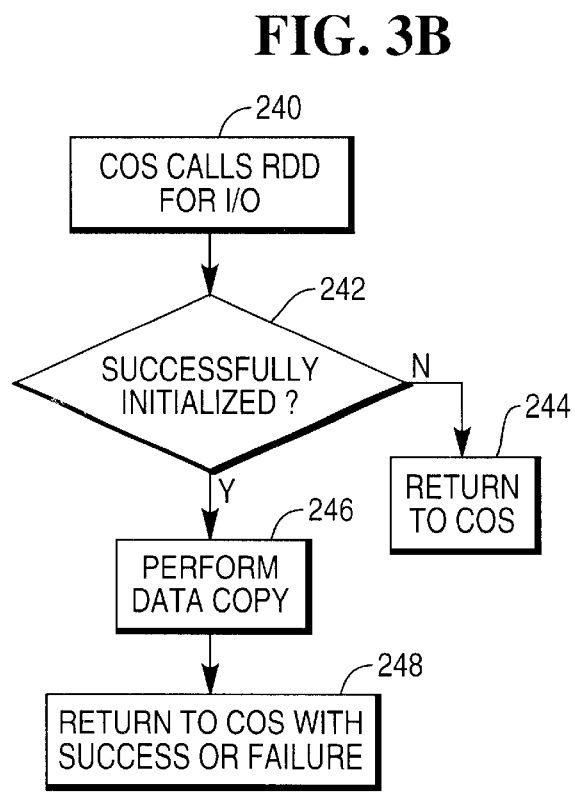

Referring to FIG. 3B, a flow diagram of processing (related to RAM-disk reads and writes) for an adjunct RAM-disk device driver in accordance with the present invention is shown. In step 240, the RDD receives a call from the COS to perform an input or output operation. The RDD determines (step 242) if a successful RAM-disk initialization has occurred and if not, flow returns to the COS (step 244). If a successful initialization has occurred, then in step 246 the RDD requests the adjunct processor to perform a data copy (i.e., a data read or write). Flow then returns to the COS with an indication of whether the data copy was successful or not (step 248).

Figure 4:
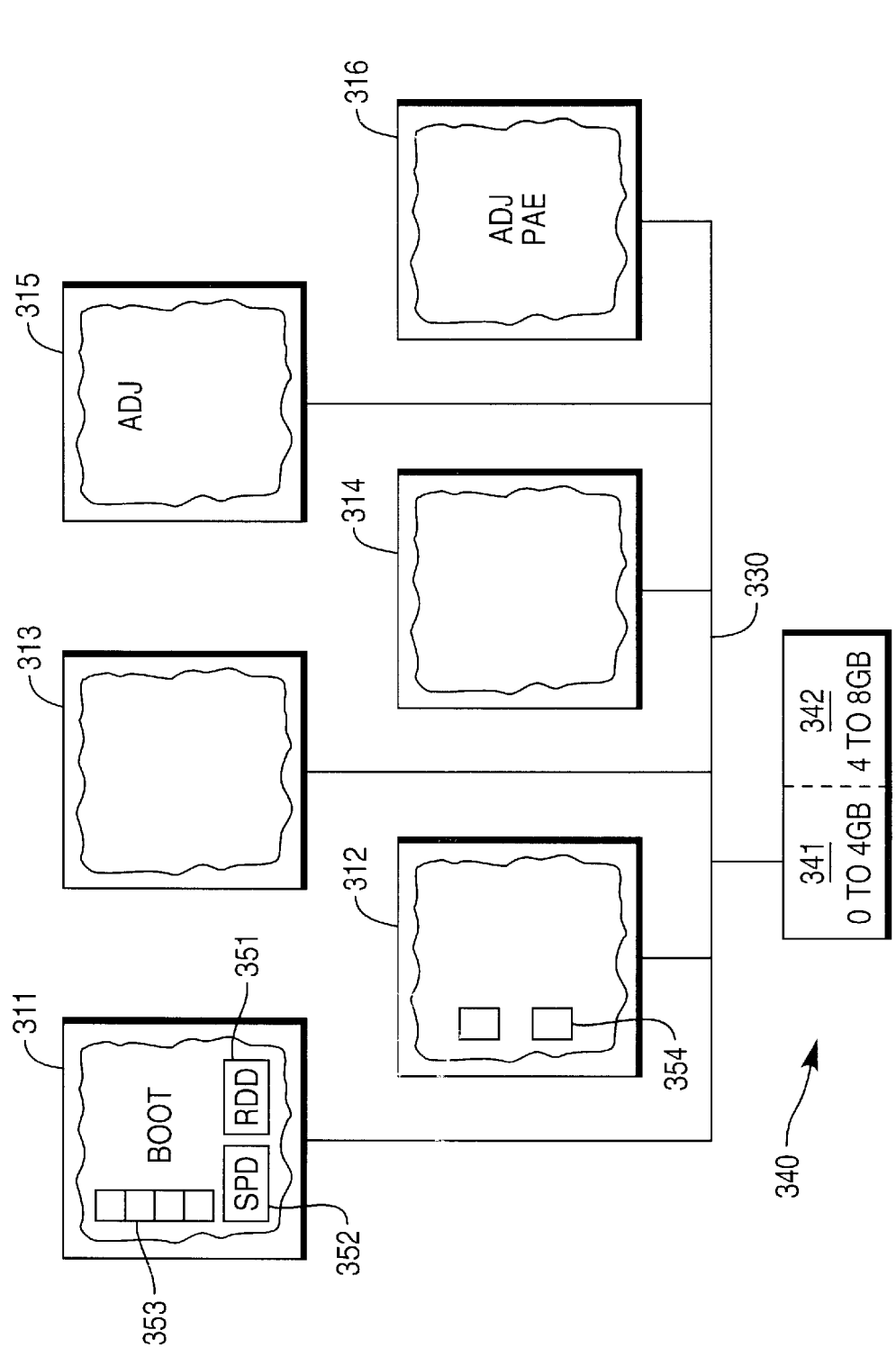
FIG. 4 is a block diagram of a multi-processor (MP) computing system having more processor than the embodiment of FIG. 1 in accordance with the present invention.

Referring to FIG. 4, a multi-processor computer system having a plurality of adjunct processors in accordance with the present invention is shown. Computer system 310 includes processors 311–316. Processor 311 is preferably the boot processor and preferably has a 32 bit address bus. FIG. 4 is intended to illustrate several features of the present invention. These include, but are not limited to, having more than two processors, having more than one processor initialized as an adjunct processor, and having an adjunct processor that is initialized in other than PAE or extended memory management mode.

Processors 311–316 are preferably coupled by a common bus 330. This bus provides communication between the processors and access to fast access memory 340. Memory 340 contains a low memory region 341, for example, from 0 to 4 GB, and a high memory region 342, for example, from 4 to 8 GB. Access to the high memory region is through processor 316 that is preferably configured in PAE mode or the like and controlled by RAM-disk device driver (RDD) 351 as discussed above with reference to FIGS. 3A–3B.

In the embodiment of FIG. 4, processors 311–314 preferably execute the COS (i.e., all of these processors preferably share the COS). Processors 315–316 are preferably adjunct processors. Note that this division of 4 and 2 is for pedagogical purposes and any combination of processors having at least one adjunct and one COS processor is within the present invention.

Boot and system configuration is preferably carried out by special platform driver (SPD) 352 as discussed above with reference to FIG. 2. Processor 311 preferably has standard device drivers (collectively represented by reference numeral 353) for conventional devices. Standard device drivers may also be provided in other processors (e.g., device drivers 354).

It should be recognized that while processors 20 and 311 preferably execute a COS based on a 32 bit address bus, the present invention is applicable to computer systems using a COS that is based on any size address bus. For example, the present invention includes a computer system having a boot processor that executes a COS based on a 64 bit address bus and an adjunct processor that is initialized in a special mode that utilizes an address bus that is other than a conventional 64 bits address bus.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A multi-processor computing system, comprising:
   a first processor;
   a second processor;
   fast acess memory coupled to said first processor and to said second processor;
   wherein said first processor is configured to run in a non-enhanced mode and said second processor is configured to run in an enhanced mode;
   wherein said second processor controls supplemental fast access memory that is not directly accessible by said first processor, said supplemental fast access memory being beyond the addressable range of said first processor; and
   wherein said second processor is initialized in such a manner as to appear as a RAM-disk device to said first processor.

2. A multi-processor computing system, comprising:
a first processor;
a second processor;
fast access memory coupled to said first processor and to said second processor;
wherein said first processor is configured to run in a non-enhanced mode and said second processor is configured to run in an enhanced mode; and
wherein said non-enhanced mode processor executes a commodity operation system and said enhanced mode processor does not execute a commodity operating system;
logic located in at least one of said first and second processors that creates an interface between the commodity operating system of said first processor and said second processor;
wherein said interface creating logic includes logic that creates an interface which causes said second processor to appear as a memory device to said first processor, and wherein said second processor appears as a RAM-disk device.

3. A method of processing for a multi-processor computer system, comprising the steps:
providing a first processor;
providing a second processor;
providing fast acess memory that is coupled to said first processor and to said second processor;
initializing said first processor in non-enhanced mode; and
initializing said second processor in enhanced mode;
providing fast access memory coupled to said second processor that is outside the addressable range of said first processor address bus; and
configuring said second processor and supplemental memory to appear as a RAM-disk device to said first processor.

4. A multi-processor computing system, comprising:
a first processor;
a second processor; and
fast access memory coupled to said first processor and to said second processor;
wherein said first processor executes a commodity operating system, said first processor and said commodity operating system supporting a 32-bit physical address space;
wherein said second processor is configured to run in an enhanced mode, said second processor executing a non-commodity operating system, said second processor and said non-commodity operating system supporting an expanded physical address space, said expanded physical address space having a width greater than 32 bits; and
wherein said second processor controls supplemental fast access memory that is beyond the addressable range of said first processor, said supplemental fast access memory being accessible to said second processor through use of said expanded physical address space.

5. The multi-processor computing system in accordance with claim 4, further comprising:
logic located in at least one of said first and second processors that creates an interface between the commodity operating system of said first processor and said second processor, said logic causing said second processor to appear as a memory device to said first processor.

6. The multi-processor computing system in accordance with claim 5, wherein said second processor appears as a RAM-disk device.

7. The multi-processor computing system in accordance with claim 4, wherein said second processor's enhanced mode comprises a physical address extension mode allowing a processors 32-bit virtual address space to map to a 36-bit physical address space.

* * * * *